United States Patent
Wieczorek et al.

(10) Patent No.: US 7,597,132 B2
(45) Date of Patent: Oct. 6, 2009

(54) WINDOW SHADE

(75) Inventors: Joseph P. Wieczorek, Lake Orion, MI (US); Bryan Busha, Grand Blanc, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 354 days.

(21) Appl. No.: 11/242,335

(22) Filed: Oct. 3, 2005

(65) Prior Publication Data

US 2007/0074829 A1 Apr. 5, 2007

(51) Int. Cl.
*E06B 9/56* (2006.01)

(52) U.S. Cl. .................... 160/318; 160/323.1

(58) Field of Classification Search ............. 160/238, 160/264, 232.1, 302, 305, 31, 309, 313, 318, 160/323.1; 242/371, 375, 376, 376.1
See application file for complete search history.

(56) References Cited

U.S. PATENT DOCUMENTS

| | | | |
|---|---|---|---|
| 302,368 A | 7/1884 | Winn | |
| 704,738 A | 7/1902 | Edwards | |
| 708,701 A | 9/1902 | Edwards | |
| 1,132,655 A | 3/1915 | Forsyth | |
| 1,133,227 A | 3/1915 | Bundy et al. | |
| 1,144,030 A | 6/1915 | Drumm | |
| 1,184,586 A | 5/1916 | Souders | |
| 1,202,286 A | 10/1916 | Hartshorn | |
| 1,378,347 A | 5/1921 | Hart | |
| 1,459,155 A | 6/1923 | Ioor | |
| 1,513,499 A | 10/1924 | Goodman, et al. | |
| 1,623,835 A | 4/1927 | Glenister | |
| 1,726,589 A | 9/1929 | Schultes | |
| 1,786,550 A | 12/1930 | Story | |
| 1,853,150 A * | 4/1932 | Schultes | 160/306 |
| 1,965,496 A * | 7/1934 | Hesse | 160/313 |
| 2,012,261 A | 8/1935 | Drumm | |
| 2,110,048 A | 3/1938 | May | |
| 3,146,825 A | 9/1964 | Briggs, Jr. et al. | |
| 3,180,401 A * | 4/1965 | Gambon et al. | 160/265 |
| 3,318,994 A * | 5/1967 | Perrone et al. | 174/69 |
| 4,014,478 A * | 3/1977 | Bonacina | 242/379 |
| 4,222,601 A | 9/1980 | White et al. | |
| 4,228,843 A | 10/1980 | Kobayashi | |

(Continued)

OTHER PUBLICATIONS

Definition of 'cord' Merriam-Webster Online Dictionary. 2008. Merriam-Webster Online. downloaded on Sep. 9, 2008 <http://www.merriam-webster.com/dictionary/cord> definition provided in office action.*

*Primary Examiner*—Katherine W Mitchell
*Assistant Examiner*—Jaime F Cardenas-Garcia
(74) *Attorney, Agent, or Firm*—Raggio & Dinnin, P.C.

(57) ABSTRACT

A window shade for use in an automotive vehicle is disclosed. The window shade includes a roll tube having a shade panel fixed to the roll tube at one end thereof. The window shade also includes a center bearing ranged within the roll tube. The window shade also includes an end bearing arranged at each end of the tube. The window shade also includes a cord arranged over the center bearing and within, the roll tube. The window shade also has an axle arranged in each end thereof with the cord passing through an orifice and wrapped around the end of each axle within the interior of the roll tube.

19 Claims, 2 Drawing Sheets

U.S. PATENT DOCUMENTS

| | | | |
|---|---|---|---|
| 4,335,773 A | 6/1982 | Masi | |
| 4,346,749 A | 8/1982 | Singletary et al. | |
| 4,534,396 A | 8/1985 | Jung | |
| 4,668,001 A | 5/1987 | Okumura et al. | |
| 4,671,557 A | 6/1987 | Lemp | |
| 4,762,358 A | 8/1988 | Levosky et al. | |
| 4,826,099 A * | 5/1989 | Johnson | 242/375 |
| 5,031,682 A | 7/1991 | Tedeschi | |
| 5,036,898 A * | 8/1991 | Chen | 160/23.1 |
| 5,054,533 A * | 10/1991 | Lii | 160/302 |
| 5,105,871 A * | 4/1992 | Baud et al. | 160/310 |
| 5,226,467 A * | 7/1993 | Lii | 160/302 |
| 5,271,446 A * | 12/1993 | Hwang | 160/23.1 |
| 5,676,415 A | 10/1997 | Ament et al. | |
| 5,685,354 A * | 11/1997 | Kim | 160/122 |
| 5,711,568 A * | 1/1998 | Diem et al. | 296/37.16 |
| 5,901,770 A * | 5/1999 | Belpaume et al. | 160/133 |
| 5,961,172 A | 10/1999 | Ament et al. | |
| 6,179,373 B1 | 1/2001 | Bohm et al. | |
| 6,443,793 B1 * | 9/2002 | Huebl et al. | 446/61 |
| 6,700,553 B2 * | 3/2004 | Becker et al. | 345/31 |
| 7,402,966 B2 * | 7/2008 | Bellingroth | 318/135 |
| 2004/0065416 A1 * | 4/2004 | Auger et al. | 160/84.05 |

* cited by examiner

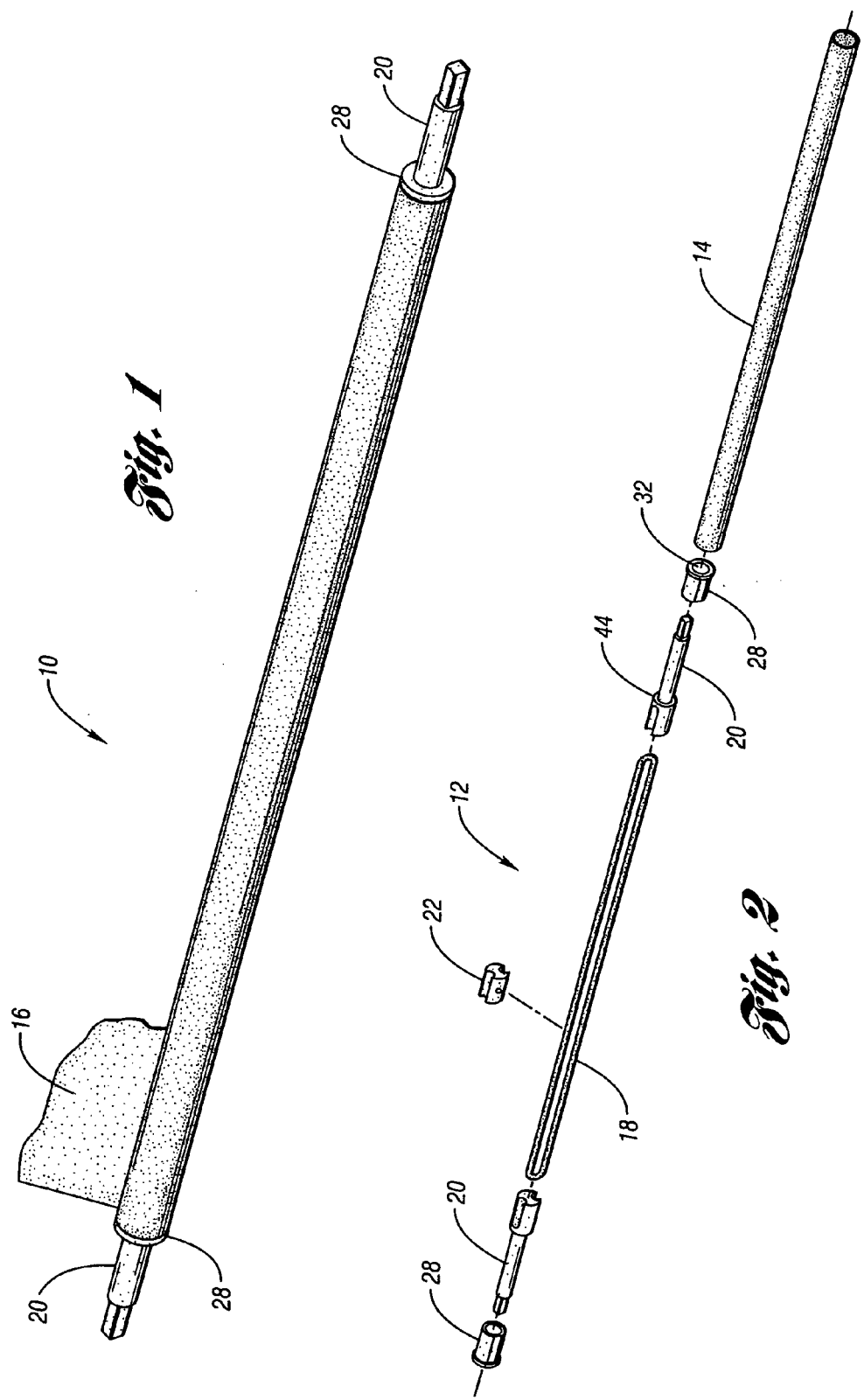

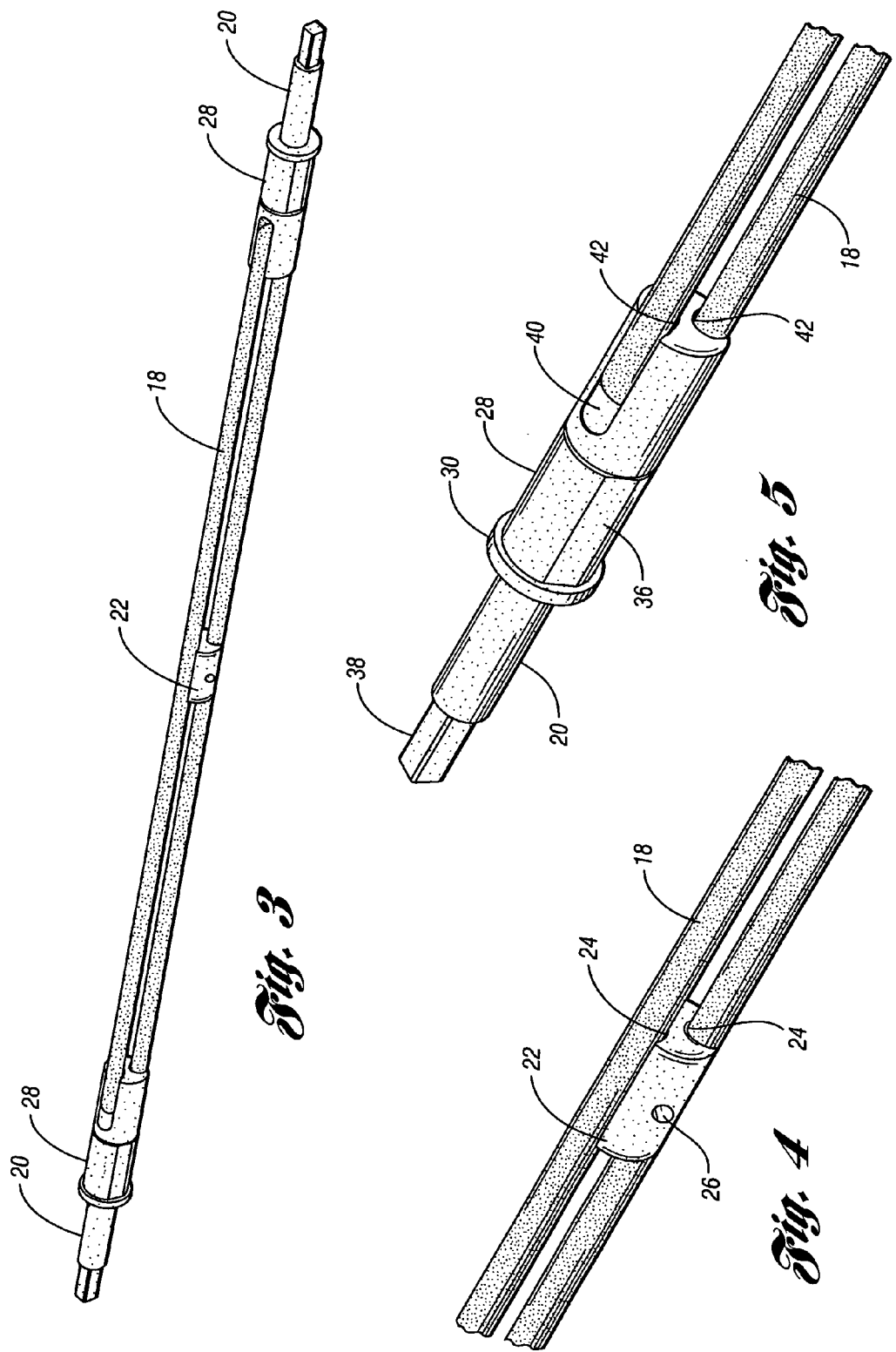

WINDOW SHADE

BACKGROUND OF THE INVENTION

1. Field of the Invention

The present invention generally relates to window shades and more particularly relates to a security shade for use in a window of an automotive vehicle.

2. Description of Related Art

Security shades have been known for many years in the art. Some of the many styles of motor vehicles do not provide covered areas for storing cargo or other personal items. In these vehicles any articles in the cargo area could be easily viewed from the exterior of the vehicle. To hide these articles from view motor vehicle manufacturers typically provide a flexible security shade or panel that can be extended to cover the cargo area and prevent anyone outside the vehicle from readily viewing any stored articles. Also, many motor vehicle manufacturer's provide a flexible security shade or panel that attaches above a window in the roof or headliner of the vehicle to create a sun shade or security shade to block viewing from the outside of the vehicle through the windows of the automotive vehicle.

Many prior art security and window shades generally include a flexible fabric panel, which is wrapped onto a roller tube mounted to a supported structure on the vehicle. The roller tube is rotationally biased so that the panel can be extended to cover the compartment area and retracted onto the roller tube for storage when not in use. The end of the shade panel is generally provided with a pull tube or stiffener having a handle that enables the panel to be conveniently extended. The pull tube also includes clips or tabs which engage brackets mounted to the vehicle interior in the cargo area or near the windows and maintain the panel in its extended position. Many of these prior art security shades or window shades are mounted in a vehicle such that the roller tube is positioned across one end of the cargo area with the shade panel being extendable rearward toward a vehicles rear cargo door. Many of the window mounted security shades are mounted near a top portion of the window and are pulled down to cover all or part of a window. The security shade is positioned behind a rear seat back that can be folded down to enlarge the cargo area of the vehicle. When the cargo area is enlarged the security shade may be removed to prevent it from obstructing and reducing cargo area. For this and many other reasons, security shades often feature a mounting system which will allow them to be removed from and reinstalled into the vehicle. Therefore, the end units and roller tubes for security shades include many components which increase the cost and complexity along with the overall weight of security shades and window shades. Many of the prior art security and window shades require many components to assemble the removable mounting portion of the shades and rotational biasing components for the roller tube. Generally, this type of assembly requires many hours of individual labor and requires many different components that are adaptable to different vehicle applications, including vehicle models, vehicle widths, and orientation of the security shade within the automotive interior.

Therefore, there is a need in the art for an improved window security shade for use in an automotive vehicle. There also is a need in the art for a window shade that reduces the weight by reducing metal content while still providing appropriate robustness and durability while extending the cover and retracting the cover onto the roller tube for storage. Furthermore, there is a need in the art for an improved window shade that incorporates a silicone cord into the shade for easy handling by the occupants of the vehicle and improve the appearance of the vehicle for the manufacturer. There also is a need in the art for a window shade that has increased durability and has a retraction system that is easy to assemble and install within the roller tube and within the vehicle interior.

SUMMARY OF THE INVENTION

One object of the present invention may be to provide an improved window shade.

Another object of the present invention may be to provide a window shade having a roll tube with a silicone cord acting as a spring mechanism to retract the window shade to a stored position.

Still a further object of the present invention may be to provide a window shade that is lighter in weight and is easier to assemble.

Still a further object of the present invention may be to provide a lower cost window shade for use in a vehicle.

Yet a further object of the present invention may be to provide a roll tube having a center bearing arranged therein to provide support to a spring mechanism arranged therein.

To achieve the foregoing objects a window shade for use in a vehicle according to the present invention is disclosed. The window shade includes a roll tube and a shade panel fixed to the roll tube at one end thereof. The window shade also includes a cord arranged within the roll tube. A center bearing is arranged within the roll tube. The window shade includes an axle arranged at each end of the roll tube with the axle having an orifice therein. The window shade also includes an end bearing arranged in each end of the roll tube.

One advantage of the present invention is that it may provide an improved window shade.

Another advantage of the present invention is that it may provide a window shade having a silicone cord arranged therein.

Still a further advantage of the present invention is that it may provide a window shade that is lower in cost and reduces the manufacturing and assembly time of the window shade.

Other objects, features and advantages of the present invention will become apparent from the subsequent description and dependent claims taken in conjunction with the accompanying drawings.

BRIEF DESCRIPTION OF THE DRAWINGS

FIG. 1 shows a window shade for use in a vehicle according to the present invention.

FIG. 2 shows an exploded view of a window shade according to the present invention.

FIG. 3 shows a window shade drive with the roll tube removed according to the present invention.

FIG. 4 shows the center bearing used in the window shade according to the present invention.

FIG. 5 shows a close up view of an end unit of the window shade drive according to the present invention.

DESCRIPTION OF THE EMBODIMENT(S)

According to the drawings, a window shade drive 12 for use with a window shade 10 according to the present invention is shown. It should be noted that the window shade 10 and shade drive 12 is generally used in a motor vehicle or may be used in any type of vehicle that includes windows or a cargo area wherein the shade 10 will be used to cover the cargo area and hide contents located within the cargo area or cover windows to block viewing from the outside of the vehicle through the windows or to reduce sun glare through the windows on a person inside the motor vehicle. The window security shade 10 may be generally arranged near any window of an automotive vehicle except the front window during operation of the vehicle. The shade 10 may be pulled towards any edge of the window depending on the location of the window shade 10 with relation to the window. It is contemplated to have the window security shade 10 pulled from a top portion of the window down to a bottom portion of the window, or from either side of the window to the opposite side of the window or from the bottom edge of the window to the top edge of the window. The window security shade 10 is removable and capable of being stored either inside or outside the motor vehicle when not in use. The window shade 10 includes a roll tube 14, with a shade panel 16 wound about the roll tube 14 and fixed to the roll tube 14 on one end of the panel 16. The opposite end of the shade panel 16 includes a pull tube or pull handle. The pull handle will be pulled to deploy the shade panel 16 and unroll the shade panel 16 from the roll tube 14. At its fully extended position clips, any known type of fastener, or a suction cup on or near the ends of the pull handle or panel are engaged with corresponding brackets mounted to side walls of the vehicle near the windows or to the windows themselves to retain the shade panel 16 in its extended position covering the window area. When the clips or suction cups are disengaged, a rotational biasing force exerted by the roll tube 14 and the associated support assemblies will wind the shade panel 16 back onto the roll tube 14 for storage.

The roll tube 14 has a predetermined length that will vary based on the automotive vehicle in which the roll tube 14 is being used. The length will change depending on the width of the windows and/or length of the windows being covered by the window shade 10. It is even contemplated that the roll tube 14 may be used with a cassette or trim cover which fits over both the roll tube 14 and the wound shade panel 16. The cassette protects the components of the window shade 10 from inadvertent damage, and prevents foreign objects from interfering with the operation and provides an enhanced appearance for the window shade 10. If the cassette is used a longitudinal slot will be provided through the cassette such that the shade panel 16 can be deployed from and retracted onto the roll tube 14 without interference. It should be noted that an end tube may be arranged over the cassette or over the end of the roll tube 14 to allow for insertion in the brackets arranged on brackets of the motor vehicle adjacent to the windows. The roll tube 14 is generally made of a metal material, however any other plastic, composite, fabric, ceramic, natural material, paper or the like may be used for the roll tube 14 according to the present invention.

Arranged within the roll tube 14 is a rotational biasing mechanism. In one contemplated embodiment the rotational biasing mechanism is a cord 18 wherein the cord 18 is made of a silicone material. However, it should be noted that any other plastic, rubber, fabric, metal, composite, or the like may be used to create the cord 18 arranged within the roll tube 14. The cord 18 is longitudinally arranged within the roll tube 14. The cord 18 will be used to create the rotational biasing force needed to retract the shade panel 16 back onto the roll tube 14 from the extended position of the shade panel 16 across the window of the motor vehicle. The silicone cord 18 will generally have a circular cross section and may even have a hollow ring like circular cross section. It should be noted that any known shape can be used for the silicone cord 18 depending on the design requirements and rotational biasing fore needed to retract the shade panel 16 onto the roll tube 14. The silicone cord 18 generally will have a predetermined length and will generally have a loop like shape when installed within the roll tube 14. The silicone cord 18 will be inserted into a first and second axle 20 using either a first or second end of the cord 18. The first and second end of the cord 18 will then be fastened to one another via any known fastening techniques such as mechanical means, chemical bonding means or any other fastening techniques even such as but not limited to tying a knot between the two ends or any other fastening techniques for taking two ends of a cord and creating a loop like structure that generally will have an oval like shape when deployed within the roll tube 14 of the window shade 10. It is even contemplated in another embodiment to use a silicone cord 18 that has a plurality of channels through a center portion thereof to reduce weight and increase flexibility of the silicone cord 18. The silicone cord 18 will generally extend in a longitudinal direction a predetermined length within the roll tube 14 depending on the size of the axles 20 arranged within each end of the roll tube 14. In its retracted position the window shade silicone cord 18 will have a generally oval shape arranged between the first and second axle 20 and over a center bearing 22. When the window shade 10 is in its fully extended position the silicone cord 18 will wind or twist around each length of the oval like shape creating a generally dual helix or twisted shape for the silicone cord 18 in the shades extended position.

The window shade drive 12 also includes a center bearing 22 arranged at or near a mid point of the roll tube 14. The center bearing 22 generally has a cylindrical shape with a first and second groove 24, generally having a U-shape, arranged on an outer surface thereof. The grooves 24 are arranged on opposite sides of the center bearing 22. The center bearing 22 will also include an orifice 26 or predetermined depth cavity through a diameter thereof. In one contemplated embodiment the orifice 26 will pass through the entire diameter while in another contemplated embodiment a cavity will extend a predetermined distance through the diameter of the center bearing 22. The cord 18 will be arranged in the first and second groove 24 of the center bearing 22. Then the center bearing 22 will be arranged at or near a mid point of the cord 18 and at or near a mid point of the roll tube 14. Any known manufacturing technique can be used to arrange the center bearing 22 within the roll tube 14. It is also contemplated to use multiple center bearings 22 within the roll tube 14 at different positions with relation to the cord 18. The center bearing 22 will be rotatably fixed with respect to the roll tube 14. This will ensure that the center bearing 22 rotates when the roll tube 14 rotates and will allow for the center bearing 22 to rotate with relation to the cord 18. The securing of the center bearing 22 to the roll tube 14 also secures the center bearing 22 at a specific point within the roll tube 14. In one contemplated embodiment the center bearing 22 will be staked to the roll tube 14 from the outside of the roll tube 14 into the orifice 26 of the center bearing 22. However, it is also contemplated to secure the center bearing 22 within the roll tube 14 by any known fastening technique including but not limited to any mechanical method or apparatus, chemical bonding technique or the like depending on the design requirements for the roll tube 14 and window shade drive components of the window shade 10. The center bearing 22 in one embodiment is made of a plastic however, any other known metal, composite, ceramic, fabric, paper, board, or natural material may also be used for the center bearing 22 depending on the design requirements for the window shade 10. It should be noted that the center bearing 22 locks the cord 18 in place allowing the roll tube 14 to spin on the axles 20 which are arranged in each end of the roll tube 14.

An end bearing 28 is arranged in each end of the roll tube 14. It should be noted that it is contemplated to have one of the end bearings 28 with a compression bearing located therein to allow for insertion of the window shade 10 into brackets held near a window. However, it is also contemplated to have the end bearing 28 as a fixed bearing in each end of the roll tube 14 and a window shade 10 installed within the head liner or other interior portion of the automotive vehicle interior. The end bearing 28 generally has a cylindrical shape with a circumferential flange 30 extending from an outer surface of one end thereof. The end bearing 28 also includes a generally circumferential cavity 32 along an inner portion thereof. This will create a hollow cylindrical shaped bearing for use in each end of the roll tube 14. The end bearing 28 also includes at least one flat surface 36 on an outer surface of the end bearing 28. It is also contemplated to have multiple flat surfaces 36 located on an outer surface of the end bearing 28 to ensure for proper insertion and securing of the end bearing 28 within the roll tube 14. The flat surface 36 can be used to create a dinking effect in the roll tube 14 for the window shade 10. The flat surface 36 may engage with another flat surface located on each end of the roll tube 14 or in another contemplated embodiment the generally circumferential roll tube 14 may be squeezed or compressed in alignment with the flat surface 36 to create a fastening mechanism by deforming the generally circumferential surface of the roll tube 14 to a non-circumferential surface via a force exerted on the exterior of the roll tube 14 over the flat surface 36 of the inserted end bearing 28. It should be noted that the end bearing 28 generally is made of a plastic material, however any other metal, composite, ceramic, paper, cardboard, or other natural material may be used for the end bearing 28.

The window shade 10 also includes an axle 20 arranged within both ends of the roll tube 14. The axle 20 is arranged within the roll tube 14 such that a predetermined portion extends from the end of the roll tube 14 and is used to connect to a mounting bracket or the like located near the window of the automotive vehicle. The axle 20 generally has a cylindrical shape. The axle 20 includes a first size diameter on one end thereof then a reduced diameter portion and a boss type end 38 on the opposite end thereof. The large diameter portion of the axle 20 has a predetermined shaped orifice 40 through a diameter thereof. A first and second groove 42, generally having a U-shape, extends from the orifice 40 on both sides thereof and to the end of the axle 20 to create a pocket for the cord 18 to be retained in after the cord 18 is passed through the orifice 40 of the axle 20. It should be noted that any shaped groove may be used for the axle 20 or center bearing 22. The reduced diameter portion of the axle 20 will create a shoulder 44 that will engage with an end of the end bearing 28 and properly align the axle 20 with relation to the roll tube 14 and silicone cord 18 arranged within the roll tube 14. The opposite end of the axle 20 has a boss type shape which will be used to interact with a similar shaped bracket attached to the interior of the vehicle near a window. In one embodiment contemplated and as shown in the drawings, the end 38 will have a square cross section that will mate with a square orifice located on a bracket of the automotive vehicle interior. It should be noted that another contemplated embodiment uses an orifice that may be placed through the boss end 38 of the axle 20 to allow for rotatable fixing of the axle 20 to the vehicle interior. The square boss member 38 will be used to ensure the axle 20 rotates or spins with relation to the roll tube 14, end bearing 28 and center bearing 22. The axle 20 will spin within the end bearing 28 when the window shade 10 is being placed in its extended position and being retracted into its stored position. During the extension of the window shade 10 or retraction of the window shade 10 the axle 20 will not rotate and only the roll tube 14, end bearing 28, and center bearing 22 will rotate during such operations. It should be noted that in one contemplated embodiment the axle 20 is made of a plastic material, however any other metal, ceramic, composite, paper, cardboard, or natural material may be used for the axle 20. It is also contemplated to have a compression mechanism located in either one or both ends of the axle 20 to allow for easy insertion of the window shade 10 into a variety of positions within an automotive vehicle having pre-positioned brackets therein.

To assemble the window shade 10 a predetermined length of silicone cord 18 having a first and second free end is placed through an orifice 42 of a first and second axle 20. The cord 18 after being wrapped through the axle 20 on both ends is arranged within the grooves 24 of the center bearing 22. Then the first and second ends of the silicone cord 18 are fixed to one another by any known mechanical fastening technique, chemical bonding technique or the like. This will create a predetermined size loop or oval shape for the silicone cord 18 which will be sized to that of the roll tube 14 used for a predetermined sized window within an automotive vehicle. After the first and second axle 20 are connected to one another via the silicone cord loop, one of the two axles 20 is placed through the roll tube 14 until a predetermined portion of each roll tube 14 extends from each end. A first and second end bearing 28 is then placed over each of the first and second axles 20 and inserted into the ends of the roll tube 14. The outer circumference of the first and second end bearing 28 generally mimics and is the same or similar to that of the inner diameter of the roll tube 14. The end bearings 28 are arranged within the ends of the roll tube 14 until the circumferential flange 30 of each end bearing 28 contacts the shoulder portion of the axle 20 and contacts the end of each roll tube 14. This will allow for precise alignment of the silicone cord 18 with relation to the roll tube 14 and axle 20. A fastener or clip is then placed over one portion of the axle 20 extending from the roll tube 14 to properly align the axles 20 with relation to the roll tube 14. It should be noted that an orifice may be placed through a predetermined position of the diameter of the axle 20 to allow for the insertion of a fastener to ensure proper axial location with relation to the longitudinal length of the roll tube 14 of the axles 20. The center bearing 22 is then fixed to the roll tube 14 via any known fastening technique. In one contemplated embodiment it is staked from an outer surface of the roll tube 14 into the orifice 26 of the center bearing 22. However, any other mechanical fastening or chemical bonding techniques may be used to fasten the center bearing 22 within the roll tube 14. Next the window shade 10 is placed within brackets near a window of an automotive vehicle.

In operation, when the window shade 10 is in its stored or rolled around position on the roll tube 14 the silicone cord 18 will be in its home or oval like position along the entire length of the roll tube 14 between the center bearing 22 and axles 20 on both ends thereof. When the user of the window shade 10 extends the window shade 10 into its fully extended position, the center bearing 22, end bearings 28, and roll tube 14 will rotate with respect to the axles 20 on each end wherein the axles 20 are fixed to the brackets or other connecting technology in the walls of the interior of the automotive vehicle near the window of the vehicle. With the axles 20 being rotatably fixed to the interior of the vehicle the roll tube 14, end bearings 28 and center bearing 22 are capable of rotation with respect to the axle 20 which will allow the cord 18 to be wound or twisted between the center bearing 22 and each axle 20 located on the end of the cord 18. This twisting will create stored energy in the form of a rotational biasing force that will be used to return the window shade 10 to its stored or wound position around the roll tube 14. With the cord 18 being twisted, the window shade 10 now has the rotational biasing force necessary to rotate the roll tube 14 and hence the shade panel 16 back to its stored position when the operator of the automotive vehicle removes it from the extended position and releases the window shade 10 for retraction. After the window shade 10 is released from its extended position, the cord 18 will unwind or untwist thus placing the center bearing 22, roll tube 14, and end bearings 28 back to their fully retracted positions putting the silicone cord 18 back in its original oval like shape with relation to the axle 20 and center bearing 22. This will allow for a reduced weight spring mechanism to be used in returning the window shade 10 to its retracted or stored position from its extended position. The silicone cord 18 will greatly reduce weight and assembly time of the window shade 10 according to the present invention. It will further increase durability and robustness of the spring mechanism of the window shade 10 for the automotive manufacturer.

The present invention has been described in an illustrative manner, it is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A window shade drive for use with a window shade in a vehicle, said shade drive including:
   a roll tube;
   a resilient cord arranged within said roll tube;
   a center bearing mounted inside the roll tube and located at the longitudinal center of said roll tube;
   said center bearing having a first groove on an outer surface thereof and a second groove arranged on an opposite side of said center bearing, with a portion of the said resilient cord located within each groove;
   an axle having an orifice in one end, said cord is arranged in said orifice of said axle; and
   an end bearing arranged within an end of said roll tube.

2. The shade drive of claim 1 wherein said resilient cord is made of a silicone.

3. The shade drive of claim 1 wherein said center bearing is rotatably fixed to said roll tube.

4. The shade drive of claim 1 wherein said center bearing having an orifice through a diameter thereof, each of said grooves generally having a U-shaped cross section.

5. The shade drive of claim 1 wherein said end bearing having an orifice through an entire length thereof.

6. The shade drive of claim 1 wherein said end bearing having a circumferential flange on an end thereof.

7. The shade drive of claim 1 wherein said end bearing having a flat portion on an outside surface thereof, said flat portion interacts with an inside surface of said roll tube.

8. The shade drive of claim 1 wherein said cord wraps through said orifice in said axle.

9. The shade drive of claim 1 wherein said roll tube, said center bearing, and said end bearing rotate with respect to said axle.

10. The shade drive of claim 1 wherein said axle is rotatably fixed with respect to the vehicle.

11. The shade drive of claim 1 wherein said axle is arranged in each end of said roll tube, said axle having a first and second groove.

12. The shade drive of claim 11 wherein said cord wraps through both of said axles and is arranged in said first groove and said second groove of said center bearing, said cord having a first and second end secured to one another to form a closed loop like member, said first groove is arranged approximately 180° from said second groove.

13. A shade for use on a window in a vehicle, said shade including:
    a roll tube;
    a shade panel fixed to said roll tube at one end thereof;
    a resilient cord arranged within said roll tube;
    a center bearing mounted inside the roll tube and located at the longitudinal center of said roll tube;
    said center bearing having a first groove on an outer surface thereof and a second groove arranged on an opposite side of said center bearing, with a portion of the said resilient cord located within each groove;
    an axle arranged in each end of said roll tube, said axle having a first diameter for a predetermined portion thereof and a second diameter that is less than said first diameter for another predetermined portion thereof, said first diameter portion of said axle having an orifice therein, said cord having a generally oval shape with respect to said axles and said center bearing when the shade is in a retracted position; and
    an end bearing arranged in each end of said roll tube.

14. The security shade of claim 13 wherein said cord is made of a silicone material, said cord winds into a twisted shape when the shade is in an extended position.

15. The security shade of claim 13 wherein said end bearing having a flat portion on an outer surface thereof.

16. The security shade of claim 13 wherein said axle is arranged through an orifice of said end bearing, said end bearing rotates with respect to said axle, said first diameter portion having a first and second groove extending from said orifice.

17. The security shade of claim 13 wherein said cord is arranged through said orifices of said axles and forms a loop like member within said roll tube.

18. The security shade of claim 13 wherein said end bearing having a circumferential flange on one end thereof, said flange engages said end of said roll tube.

19. The security shade of claim 13 wherein said center bearing is rotatably fixed with respect to said roll tube.

* * * * *

UNITED STATES PATENT AND TRADEMARK OFFICE
CERTIFICATE OF CORRECTION

PATENT NO. : 7,597,132 B2  Page 1 of 1
APPLICATION NO. : 11/242335
DATED : October 6, 2009
INVENTOR(S) : Joseph P. Wieczorek et al.

It is certified that error appears in the above-identified patent and that said Letters Patent is hereby corrected as shown below:

On the Title Page, Item (57) - Line 4 of the ABSTRACT - Please delete "ranged" and insert -- arranged -- after "a center bearing"

Signed and Sealed this

Twenty-fourth Day of November, 2009

David J. Kappos
*Director of the United States Patent and Trademark Office*